United States Patent [19]

Bushman

[11] Patent Number: 5,775,635
[45] Date of Patent: Jul. 7, 1998

[54] AIRCRAFT ENGINE NOZZLE

[75] Inventor: Boyd B. Bushman, Lewisville, Tex.

[73] Assignee: Lockheed Martin Corporation, Houston, Tex.

[21] Appl. No.: 667,963

[22] Filed: Jun. 17, 1996

[51] Int. Cl.⁶ .................................................. B64D 33/04
[52] U.S. Cl. ................. 244/1 N; 244/53 R; 239/265.11; 181/213
[58] Field of Search ....................... 244/1 N, 53 R, 244/110 B, 73 R; 239/265.11, 265.13, 265.33, 265.23, 265.17, 265.19; 181/213

[56] References Cited

U.S. PATENT DOCUMENTS

| | | | |
|---|---|---|---|
| 2,797,547 | 7/1957 | Meulien et al. | 244/73 R |
| 3,637,042 | 1/1972 | Raynes | 239/265.13 |
| 3,893,640 | 7/1975 | Hull, Jr. et al. | 244/1 N |

*Primary Examiner*—Galen L. Barefoot
*Attorney, Agent, or Firm*—James E. Bradley

[57] ABSTRACT

An aircraft engine has a nozzle shaped to reduce the volume of Mach diamonds being formed in the exhaust plume. A notch or recess is formed in the discharge edge of the nozzle. The recess provides a forward discharge edge that causes additional Mach diamonds to occur at a regular spacing from the forward discharge edge. These additional Mach diamonds are axially staggered with other Mach diamonds, which occur at regular spacing from the rearward edge of the nozzle discharge edge. Each Mach diamond has a volume that is substantially less than one-half the volume of a Mach diamond created by a conventional nozzle. This results in less high temperature areas per axial increment in the plume than the prior art exhaust plumes. Because Mach diamonds are the primary cause of high infrared emissions, as well as acoustic noise, a reduction in the total volume of Mach diamonds in the exhaust plume thus reduces infrared emissions, as well as the noise.

11 Claims, 1 Drawing Sheet

AIRCRAFT ENGINE NOZZLE

BACKGROUND OF THE INVENTION

1. Field of the Invention

The invention relates in general to aircraft engine nozzles, and in particular to a means for reducing infrared emissions from an exhaust plume of a jet engine.

2. Description of the Prior Art

A jet engine nozzle discharge an exhaust of hot, high pressure gaseous material which creates a plume that trails the aircraft for considerable distance. Generally, the nozzle is circular, although it may also be rectangular for vectoring the exhaust for flight control. Also, in military aircraft, the diameter of the nozzle is usually variable from about 75% to 100%.

A phenomenon known as "Mach diamonds" is created in the exhaust plume due to the supersonic speed of the exhaust as it is discharged. Each Mach diamond is a generally diamond spaced volume of hotter, higher pressure than surrounding areas. The Mach diamonds are spaced apart from each other along the longitudinal axis of the plume, with the spacing being a function of the nozzle diameter. The first Mach diamond has a center point about one nozzle diameter from the rearward edge of the nozzle. Each succeeding Mach diamond has a center point about one nozzle diameter from adjacent Mach diamonds.

The exhaust plume creates a problem in that it enable detection by infrared detectors contained on missiles. Decreasing the infrared emissions from the plume would decrease the range at which the enemy missile or infrared search systems could detect the aircraft. The Mach diamonds are particularly detectable by infrared detectors, because of their higher temperatures than other portions of the plume.

Another disadvantage of the hot, high pressure plume is that is creates intense noise. The acoustic noise is caused by particle or molecular produced pressure waves. Loud noise produced from the exhaust of jet aircraft is a serious problem, particularly, in population centers located near airports.

SUMMARY OF THE INVENTION

In this invention, the nozzle is shaped to create Mach diamonds in the exhaust plume which have center points axially spaced apart from each other substantially less than a transverse maximum dimension of the nozzle. These Mach diamonds are more closely spaced than in the prior art nozzle at the rearward edge. Although this results in more Mach diamonds in the exhaust plume than previously, the cumulative volume of these Mach diamonds is much smaller than prior art Mach diamonds. Each Mach diamond has a volume that is substantially less than one-half the volume of a Mach diamond created by a conventional nozzle. This results in less high temperature areas per axial increment in the plume than the prior art exhaust plumes. Because Mach diamonds are the primary cause of high infrared emissions, as well as acoustic noise, a reduction in the total volume of Mach diamonds in the exhaust plume thus reduces infrared emissions, as well as the noise.

Preferably, the nozzle is shaped to create more Mach diamonds by placing a portion of the discharge edge of the nozzle forward of the remaining portion. Mach diamonds occur as a result of the forward discharge edge as well as rearward discharge edge. The forward and rearward discharge edge Mach diamonds are axially staggered relative to each other. Each of the first Mach diamonds has a center point about equal to the nozzle diameter from one of the discharge edges. The spacing between center points in the exhaust plume will be equal to the nozzle diameter, also.

In the preferred embodiment, the forward and rearward edges of the nozzle are created by forming a notch or recess in the discharge edge of the nozzle. The notch in the preferred embodiment extends 180 degrees and has a forward edge that is perpendicular to the axis of the nozzle. Two longitudinal side edges extend rearward from the forward edge to the rearward edge, with the longitudinal edges being parallel to the axis of the nozzle. The lengths of the longitudinal edges are equal to the one-half the diameter of the nozzle.

DETAILED DESCRIPTION OF THE INVENTION

Figure 1:
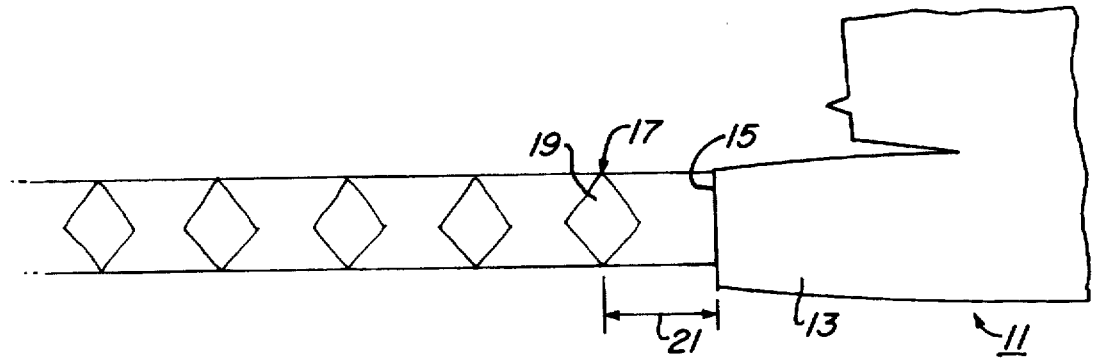
FIG. 1 is a schematic side view illustrating a portion of an aircraft having a prior art nozzle.

Referring to FIG. 1, aircraft 11 represents a military aircraft, such as a fighter plane. Aircraft 11 has a jet engine which has a nozzle 13. Nozzle 13 has a rearward edge 15 that is circular in the embodiment shown and perpendicular to the longitudinal axis of nozzle 13. Typically rearward edge 15 may constrict and expand the nozzle 13 from about 75% to 100% of the maximum diameter. A hot, high energy exhaust plume 17 is discharged from nozzle 13.

A series of Mach diamonds 19 are shown in prior art exhaust plume 17. Mach diamonds 19 are regions of high pressure that exist in exhaust plume 17 as a result of the supersonic speed of the discharge. Mach diamonds 19 are shown to be diamond shaped volumes, but actually do not appear as precise as shown in FIG. 1. Mach diamonds 19 are spaced apart from each other axially. The spacing 21 from rearward edge 15 to the center point of the first Mach diamond 19 is about one diameter of nozzle 13 at discharge edge 15. Similarly, the spacing between the center points of the succeeding Mach diamonds 19 is about one diameter of nozzle 13 at discharge edge 15. The axial extent of each Mach diamond 19 from a leading surface to a trailing surface is less than one nozzle diameter.

The temperature in the Mach diamonds 19 is higher than in the lower pressure regions of exhaust plume 17 surrounding Mach diamonds 19. Mach diamonds 19 are thus a primary source of infrared emissions of exhaust plume 17. Similarly, acoustic noise generated by plume 17 is caused by particle or molecular produced pressure waves. The majority of these sound waves are generated at the locations where particles enter and exit the high pressures Mach regions 19. The intensity of the noise created corresponds to the volume of Mach diamonds 19.

Figure 2:
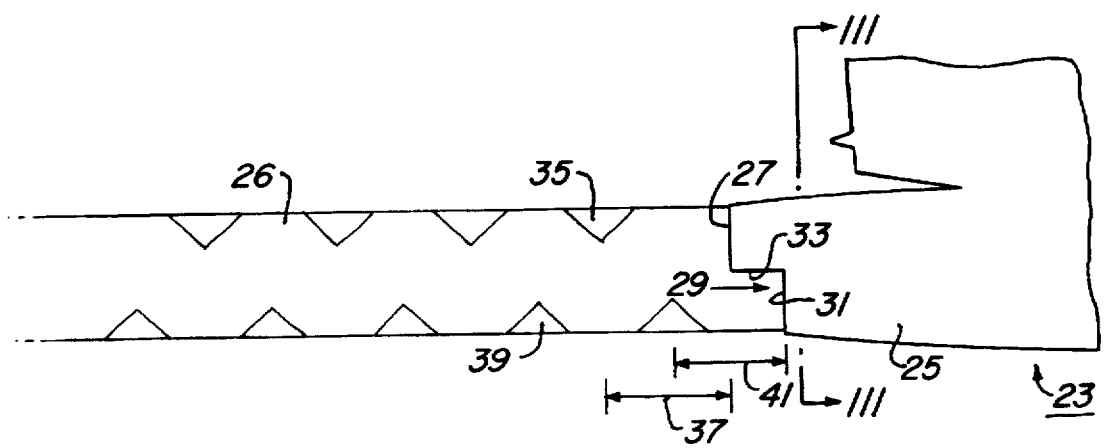
FIG. 2 is a schematic side view of an aircraft having a nozzle constructed in accordance with this invention.
Figure 3:
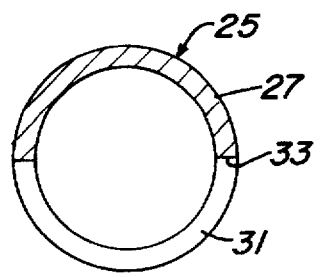
FIG. 3 is a schematic sectional view of the nozzle of FIG. 2, taken along the line II—II of FIG. 2.

In FIG. 2, aircraft 23 is the same as aircraft 11, however it has been modified in accordance with this invention. Aircraft 23 also has a turbojet engine and nozzle 25 which is shown with a circular discharge edge 27 for discharging an exhaust plume 26. However, a notch or recess 29 has been formed in it. Notch 29 has a forward discharge edge 31 which is perpendicular to the axis of the nozzle 25 and parallel to rearward edge 27. Two longitudinal, parallel edges 33 join rearward edge 27 to forward edge 31. Longitudinal edges 33 are parallel to the axis of nozzle 25, and in the embodiment shown are 180 degrees apart from each other, as illustrated in FIG. 3. This results in forward edge 31 being identical in circumferential extent to rearward edge 27, and below rearward edge 27 in the embodiment shown. The discharge end of nozzle 25 may be variable in diameter from about 75 to 100% in the same manner as in the prior art.

The distance along the axis from rearward edge 27 to forward edge 31 is equal to one-half of the maximum diameter of nozzle 25 measured at rearward edge 27. The maximum diameter at forward edge 31 is substantially the same as the maximum diameter at rearward edge 27. For a nozzle 25 that is other than circular, the distance from forward edge 31 to rearward edge 27 is equal to the maximum transverse dimension of nozzle 25 measured perpendicular to the axis at rearward edge 27. For a rectangular nozzle 25 with a width and height, the maximum transverse dimension would be the larger of the two.

Mach diamonds 35 will continue to occur at regular spacing from rearward edge 27. The axial spacing 37 between center points of Mach diamonds 35 is equal to the maximum diameter of nozzle 25 at rearward edge 27. Forward edge 31 creates additional Mach diamonds 39. The center point of the first Mach diamond 39 will be spaced a distance 41 from forward edge 31 that is equal to the maximum diameter of nozzle 25 at forward edge 31. Succeeding Mach diamonds 39 will have center points spaced apart the same spacing 41. Spacing 41 is substantially the same as spacing 37, resulting in an overlap or staggering of Mach diamonds 35 with Mach diamonds 39. The center points of Mach diamonds 35 and 39 will not be on the axis of nozzle 25 because of the rearward edge 27 being located above forward edge 31 in the embodiment shown.

A phase interference of Mach diamonds 35, 39 occurs in lower pressure and temperature regions between them. Because Mach diamonds 39 occur where previously it was an area of lower pressure, this results in a reduction in the size or volume of both Mach diamonds 35 and 39. The cumulative volume of the Mach diamonds 35 and 39 is substantially less than the prior art Mach diamonds 19 over a given length of exhaust plume 26. In other words, two of the Mach diamonds 35, 39 have substantially less volume than the volume of one Mach diamond 19 located at approximately the same distance from nozzle 25. Although the temperature and pressure within each of the Mach diamonds 35, 39 are not less than a prior art Mach diamond 19, the total volume of higher temperature, higher pressure exhaust is less.

The thrust is not decreased because there is no decrease in the number of exiting particles nor their respective velocities. The decrease in volume of prior art Mach diamond 19 into Mach diamonds 35, 39 reduces the high pressure obstacle created by Mach diamond 19, increasing thrust. Acoustic noise generated by plume 26 is caused by particle or molecular produced pressure waves. The majority of these sound waves are generated at the locations where the particles enter and exit the high pressure Mach region. Reducing the total volume of Mach diamonds reduces the amount of high pressure region and decreases the total sound generated by the plume.

Infrared emission is proportional to the temperature to the fourth power. Since Mach diamonds are the highest infrared emitters within the plume, the overall emitted infrared radiation decreases when the volume of Mach diamonds decrease.

While the invention has been shown in only one of its forms, it should be apparent to those skilled in the art that it is not so limited, but is susceptible to various changes without departing from the scope of the invention.

I claim:

1. In an aircraft having an engine which has a nozzle through which a gaseous plume exhausts along an axis of the nozzle, the improvement comprising:

the nozzle having a forward discharge edge and a rearward discharge edge, the forward discharge edge being spaced forward of the rearward discharge edge along the axis to reduce a volume of Mach diamonds created in the plume; and wherein the nozzle has a maximum transverse dimension at the rearward discharge edge measured perpendicular to the axis, and the forward discharge edge is spaced forward of the rearward discharge edge by a distance substantially equal to one-half the maximum transverse dimension of the nozzle at the rearward discharge edge.

2. The aircraft according to claim 1 wherein the rearward and the forward discharge edges are perpendicular to the axis of the nozzle.

3. The aircraft according to claim 1 further comprising two longitudinal edges which are parallel to the axis of the nozzle and which join the forward discharge edge to the rearward discharge edge.

4. The aircraft according to claim 1 wherein:

the nozzle is circular and each of the discharge edges has a circumferential extent of about 180 degrees.

5. In an aircraft having an engine which has a circular nozzle through which a gaseous plume exhausts along a longitudinal axis of the nozzle, the improvement comprising:

a rearward discharge edge of the nozzle which is substantially perpendicular to the axis, the nozzle having a maximum diameter measured at the rearward discharge edge perpendicular to the axis;

a forward discharge edge of the nozzle which is substantially perpendicular to the axis and spaced forward of the rearward discharge edge of the nozzle by an amount substantially equal to one-half the maximum diameter of the nozzle at the rearward discharge edge; and wherein each of the discharge edges extends circumferentially around the nozzle for 180 degrees with one of the discharge edges being located vertically above the other of the discharge edges.

6. The aircraft according to claim 5, further comprising two circumferentially spaced apart longitudinal edges which are substantially parallel to the axis and which join the forward discharge edge to the rearward discharge edge.

7. A method of reducing infrared emissions from an aircraft which has an engine which discharges a gaseous plume through a nozzle along an axis of the nozzle, comprising:

providing a forward and a rearward discharge edge for the nozzle which are axially spaced apart from each other an amount substantially equal to one-half of a maximum transverse dimension of the nozzle measured perpendicular to the axis at the rearward discharge edge to create a first set of Mach diamonds in the plume which are regularly spaced from the forward discharge edge and a second set of Mach diamonds in the plume which are regularly spaced from the rearward discharge edge and alternating axially with the first set of Mach diamonds.

8. The method according to claim 7 wherein the step of providing a forward and a rearward discharge edge comprises making each of the edges semi-circular.

9. The method according to claim 7 wherein the step of providing a forward and a rearward discharge edge comprises forming a recess in the rearward discharge edge of the nozzle to create the forward discharge edge.

10. A method of reducing infrared emissions from an aircraft which has an engine which discharges a gaseous plume through a circular discharge edge of a nozzle along an axis of the nozzle, comprising:

forming a recess in the discharge edge to provide a 180 degree forward discharge edge and a 180 degree rearward discharge edge with one of the forward and rearward discharge edges being located above the other of the forward and rearward discharge edges, and positioning the forward discharge edge axially forward of the rearward discharge edge about one-half a maximum diameter of the nozzle at the rearward discharge edge to create a first set of Mach diamonds in the plume which are regularly spaced from the forward discharge edge and a second set of Mach diamonds in the plume which are regularly spaced from the rearward discharge edge and alternating axially with the first set of Mach diamonds.

11. The method according to claim 10 wherein the step of forming a recess in the discharge edge comprises forming the forward discharge edge substantially perpendicular to the axis.

\* \* \* \* \*